METHOD OF MAKING A MONOMETALLIC MASK

Filed Dec. 8, 1966 Sheet 1 of 2

INVENTOR.
LOWELL E. THOMAS
BY
Weingarten, Orenbuch & Lahive
ATTORNEYS

INVENTOR.
LOWELL E. THOMAS
BY
Weingarten, Orenbuch & Lahive
ATTORNEYS

United States Patent Office 3,449,221

Patented June 10, 1969

3,449,221

METHOD OF MAKING A MONOMETALLIC MASK

Lowell E. Thomas, Lowell, Mass., assignor to Dynamics Research Corporation, Stoneham, Mass., a corporation of Massachusetts Filed Dec. 8, 1966, Ser. No. 600,249
Int. Cl. C23b *5/66, 7/00;* C23g *1/00*
U.S. Cl. 204—15 13 Claims The present invention relates to masks of the type used to selectively transmit spatial patterns of energy or matter, and more particularly pertains to a monometallic mask containing apertures of precisely predetermined size and location, and a method of manufacturing such masks.

Figure 1A:
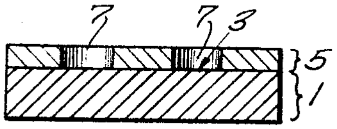

The microcircuitry which is a vital part of modern high speed computer and precision space-age technology often requires the placement of a thousand or more reiterated circuit elements on a subtrate length of less than 1 inch. Such elements are generally formed on the subtrate using thin film or vacuum deposition techniques as each element must be formed to the precise size and shape specified, in the precise location needed on the subtrate, and with the precise registration necessary to meet operating requirements. Failure of any one of the thousand or more elements in any of one of these respects can result in rejection or failure of the entire subtrate unit as well as any larger units depending on the subtrate unit. It is well recognized in the art that such failures are often attributable to the lack of precision in the mask used in the original thin film or vacuum deposition procedure. Basically, such a mask is composed of a structure having a pattern of surface area which precludes the transmission of energy or matter (whichever is of concern to the user) and a resultant pattern of aperture area, which is defined by the surface area pattern and characterized by the absence of the surface area, for permitting the transmission of energy or matter (whichever is precluded by the surface area). The aperture area, of course, need not be a void, but may be a transparent material if light transmission is desired, or even a gas permeable film if the transmission of a vapor is desired.

Like a stencil or any other non-metal mask, a metal mask has as its primary purpose the selective transmission of energy or matter through a mask aperture. The "effective" aperture, which may differ from the actual aperture, is generally the smallest cross-section of the actual aperture. Accordingly, the quality of a mask is graded initially according to the accuracy and precision with which the size and location of the effective mask apertures have been formulated.

Additional requirements of a high quality mask are that it be flat, to permit registration of the matter or energy passing through the mask aperture; and of sturdy construction, to permit repeated use of the mask without deleteriously affecting the flatness of the mask or the periphery of the mask aperture. Yet another requirement of a high quality mask, especially one designed for use over a long period of time and under a wide variety of different operating conditions, is that it be relatively stable both chemically and physically under the operating conditions, which may for example involve wide temperature fluctuations. While it is, of course, an ultimate goal to develop a metal mask fulfilling all of these requirements, metal masks fulfilling at least some of these requirements have been developed and such masks are commonly employed in such fields as optics and microcircuit fabrication.

The three commonly used prior art methods for constructing metal masks are etching, electroforming, and a combination of both methods known as the bimetal technique.

In etching, the first and earliest of these prior art processes, one surface of a metal sheet or plate within which the aperture will be formed is first covered with a continuous layer of photosensitive, etch-resistant material, more commonly known in the art as photoresist material. Depending on whether the photoresist material is of the type made preferentially removable from the metal plate by exposure to radiation or the type which is preferentially affixed to the metal plate by exposure to radiation, the photoresist material layer is then exposed to a pattern of radiation corresponding, respectively, either to the desired aperture area pattern or its complement, the surface area pattern. In either case, the photoresist material corresponding to the aperture area pattern is then removed so that a metal plate having on one face a surface area pattern of photoresist material is left. Etching fluid is then poured on the photoresist material layer and permitted to flow through the aperture therein to eat away the underlying portion of the metal plate. Being a fluid, however, the etching fluid eats not only downward through the metal plate in a path aligned with the aperture in the photoresist material layer, but also laterally, thereby attacking portions of the metal plate directly underneath the aperture-defining edge of the photoresist material. Accordingly, by the very nature of the technique, etching tends to produce effective apertures which are less well defined and not suitable for use where the resolution of the mask aperture must be high.

The second of these prior art processes, usually called either electroforming or biforming, commences with the formation of an aperture area pattern of a photosensitive, electroplate-resistant material, also known as a photoresist material, on one face of a conductive metal plate, such as copper. The exposed copper plate face is then electroplated with a thin layer of a suitable metal, such as nickel, to a thickness of approximately .0005"–.002". The photoresist material is then removed, and the copper plate is finally separated from the electroplated nickel layer to leave an apertured nickel mask. While the electroplating process forms a nickel layer having apertures corresponding with a high degree of precision to the size and location of the photoresist material on the copper plate, the electroformed nickel mask is necessarily quite thin, and accordingly extremely fragile. Furthermore, the electroformed mask is so thin that it lacks the rigidity necessary to maintain its initial flatness and, accordingly, is not suitable for use where flatness of the metal mask is an important criterion.

The third and most recently developed of the prior art processes, the bimetal technique, produces a mask of greater accuracy and sturdiness than the other processes. In the bimetal technique a thin, apertured layer of an electrodepositable metal, such as nickel, is first electroformed onto a thick plate of a conductive metal, such as copper, using an aperture area pattern of photoresist material on the copper plate to produce the desired apertures of the nickel layer. A fluid suitable for etching copper, but not nickel, is then poured on the copper where there is a suitable photoresist pattern to remove at least the portion of the copper plate aligned with the apertures in the nickel layer. The nickel layer is not separated from the copper plate as in the biforming process, but since the effective aperture of the mask will be the smallest cross-section of the aperture channel extending through the mask, it is immaterial that the relatively broad channel cross-section through the copper plate lacks resolution. As the nickel layer was formed by the electroforming process, the relatively narrow channel cross-section through this layer will be of high resolution, and accordingly, the effective mask aperture will be of high resolution. A typical bimetal mask is a lamination composed of a nickel layer of two mil thickness on a copper plate of twenty-five mil thickness and, therefore, of strong construction.

Primary disadvantages of the bimetal mask flow, naturally enough, from the use of two different metals to form a single structure. For example, unless used in a temperature-controlled environment, the mask will tend to warp and buckle as a result of the differing thermal characteristics of its component metals. Other primary disadvantages of the bimetal mask arise out of the use of different metals in contact with one another. For example, electrochemical reactions between the metal components may in time impair the resolution of the effective mask aperture and even weaken the entire mask structure.

Accordingly, it is the object and purpose of the present invention to provide a mask which has an aperture area pattern of well-defined size and location, which is of flat and sturdy construction, and which is thermally and electrochemically stable.

A further object of the present invention is to provide a process for producing a mask having the thermal and electrochemical stability of those produced by the electroforming and etching processes, the flat and sturdy construction of those produced by the etching and bimetal techniques and the high resolution aperture of those produced by the electroforming and bimetal techniques.

These and other objects of the present invention are accomplished by providing a laminated mask composed of two apertured layers of the same conductive metal, the first or electroplated layer having a predetermined effective aperture area pattern of high resolution while the second or etched layer has a larger aperture area pattern of lower resolution. It is a feature of the novel process that the first layer is electroplated onto the second layer about a photoresist material aligned with and of the same cross-section as the effective aperture area pattern of the finished mark. Both the second metal and photoresist material are subsequently removed.

Other objects, advantages and features of the present invention will become apparent from the following detailed description, when read in conjunction with the accompanying drawing wherein:

FIG. 1 is a sequence of cross-sectional views of the various stages of a mask of the present invention being constructed by the "dissolving" technique; and FIG. 2 is a sequence of cross-sectional views of the various stages of a mask of the present invention being constructed by the "melting" technique.

It should be kept in mind that the drawings are not to scale, liberties having been taken in drafting to more clearly illustrate the novel aspects of the present invention.

Having reference now to the drawing, and in particular FIG. 1, there is shown in FIG. 1A a sheet 1 of a conductive first metal having sufficient thickness to assure flatness and structural stability. The first metal sheet 1 has been coated on top surface 3 with a layer 5 of photoresist material. The photoresist layer 5 has been processed to create openings 7 in the photoresist material, aligned with but of greater cross-section than the effective apertures to be ultimately formed in the finished mask. It will be obvious to those familiar with the use of photoresist materials that such an apertured layer of photoresist material may be created by techniques well known in the art; for example, by exposing a uniform layer of photoresist material to either a surface area pattern or a complementary aperture area pattern of radiation (depending upon the type of photoresist material used) and then developing or removing the photoresist material corresponding to the aperture area pattern. The thickness of the metal sheet 1 is preferably from 10 to 20 mils as needed to provide structural strength, while the photoresist layer 5 may be considerably thinner, preferably from 0.1 to 0.2 mil.

Figure 1B:
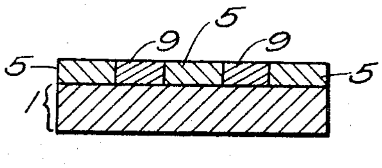

Referring now to FIG. 1B, a second conductive metal, characterized by an etch resistance different from that of the first metal, has been electroplated or deposited onto the exposed area of the first metal surface 3 to a thickness not exceeding that of the photoresist material layer 5. The islands 9 of second metal thus deposited occupy the openings 7 in the photoresist material 5 and accordingly form an aperture area pattern aligned with but of greater cross-section than the effective aperture area pattern desired in the finished mask.

Figure 1C:
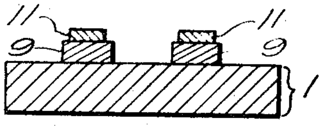

Referring now to FIG. 1C, the photoresist material of layer 5 has been removed from the first metal sheet surface 3 to expose second metal islands 9. Photoresist material suitable for precluding electroplating has been formed on the top surfaces of the second metal islands 9 to form smaller islands 11, aligned with and of the same cross-section as the effective apertures desired in the finished mask. The photoresist islands 11 may be conveniently formed, for example, by removing the photoresist material of the layer 5 shown in FIG. 1B to expose areas of the first metal surface 3, coating additional photoresist material over the exposed areas of the first metal sheet surface 3 and the top of the second metal islands 9, exposing this new photoresist layer to a surface area or aperture area pattern of light corresponding precisely to the surface area or aperture area pattern of a model of the finished mask, and removing the portions of the new photoresist layer corresponding to the surface area pattern. As the photoresist islands 11 are aligned with and of the same cross-section as the effective apertures of the finished mask while the second metal islands 9 are aligned with and of greater cross-section than the effective apertures of the finished mask, the photoresist islands 11 must occupy reduced areas of the top surfaces of the second metal islands 9.

Figure 1D:
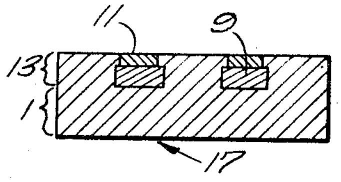

Referring now to FIG. 1D, a layer 13 of additional first metal has been formed on the exposed areas of the first metal sheet surface 3 and of the second metal islands 9, for example, by depositing the additional first metal according to conventional electroplating techniques. The additional first metal layer 13 has a thickness greater than that of the second metal islands 9 but not much greater than the combined thicknesses of the islands 9 and 11. Accordingly, the additional first metal layer 13 has a top surface higher than the top surfaces of islands 9 (that is, the bottom surfaces of islands 11) and approximately level with or slightly higher than the top surfaces of islands 11. It will be noted that in layer 13 the additional first metal is arranged in surface area patterns which define complementary or resultant aperture area patterns marked by an absence of additional first metal. It will be obvious that the volumes characterized by an absence of additional first metal will be those volumes of the first layer 13 occupied by the second metal islands 9 and smaller photoresist islands 11 at the bottom and top, respectively. As the photoresist islands 11 are aligned with and of the same cross-section as the ultimate effective mask apertures, the additional first metal about these islands 11 defines precisely the peripheries of such apertures, as will be shown below.

Figure 1E:
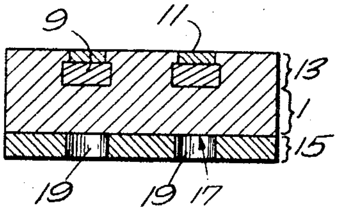

Referring now to FIG. 1E, a layer 15 of etch-resistant photoresist material has been applied to the bottom surface 17 of the first metal sheet 1, exposed to a radiation pattern, and developed to provide a surface area pattern of photoresist material having openings 19, aligned with the effective apertures desired in the finished mask. The appropriate size of each of these openings 19 is discussed in detail in connection with FIG. 1F.

Figure 1F:
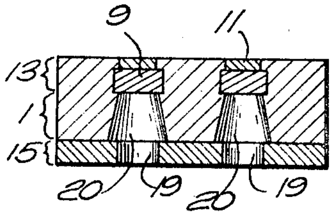

Referring now to FIG. 1F, a fluid capable of etching the first metal, but not the photoresist material of layer 15 or the second metal, has been introduced through the openings 19 of photoresist layer 15 and permitted to form voids 20 by etching and removing a vloume of the first metal under the second metal islands 9, that is, a first metal volume between the bottom surface of the islands 9 and the periphery of the openings 19. It is an essential feature of the novel process that, as a minimum, the entire volume of the first metal sheet 1 aligned with and below the photoresist islands 9 has been etched and removed.

It will be noted that the etch-resistant second metal islands 9 were in a position to preclude any etching of the additional first metal of layer 13 in the regions abutting the photoresist islands 11. It is essential that these second metal islands 9 prevent any such etching, as it is the additional first metal in these regions which will define the periphery of the desired effective aperture area pattern of the finished mask. Accordingly, it is strongly preferred that the cross-section of each opening 19 and the various variables of the etching process (for example, the volume of etching fluid, the etching time permitted, etc.) be cooperatively adjusted, as a safety measure, so that not all of the first metal covering the bottom face of the protective second metal island 9 is removed.

As the etching fluid will eat the first metal of sheet 1 laterally as well as vertically, the size of each opening 19 in the photoresist layer 15 is an important but not the sole factor in determining the volume of first metal to be eaten away by the etching fluid; that is, the size of void 20. While the openings 19 in the photoresist layer 15 are necessarily aligned with both the second metal islands 9 and the photoresist islands 11, it is a feature of one aspect of the present invention that the openings 19 are preferably of lesser cross-section than the second metal islands 9 and of greater cross-section than the photoresist islands 11.

Figure 1G:
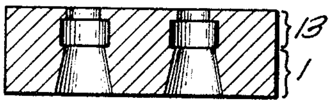

Referring now to FIG. 1G, the remaining second metal of islands 9, the photoresist material of islands 11, and the photoresist material of layer 15 have all been removed to expose the finished monometallic mask consisting only of the first metal sheet layer 1 and the additional first metal layer 13. The second metal islands 9 are preferably removed by dissolving the second metal with an etching fluid to which the first metal is stable, although other means may alternatively or additionally be used; for example, the second metal may be fused at temperatures which do not effect the first metal and permitted to flow out of the mask apertures.

The preferred embodiments of the mask produced by this "dissolving" technique is characterized by an aperture area channel having an unusual cross-section. As clearly shown in FIG. 1G, this channel cross-section is smallest in the upper part of layer 13 and largest in the lower part of layer 13. Furthermore, the channel cross-section in the upper part of layer 1 is smaller than in the lower part of layer 1. It will also be noted that the length of the channel passing through layer 13 has only two cross-sections, the interface of these two cross-sections being sharply defined, with the bottom cross-section being substantially larger than the top cross-section.

Because of its chemical stability, physical strength, electrical conductivity and ability to be electroplated, nickel is preferred for use as the first metal, although the monometallic nature of the mask and its unusual laminar construction permit almost any selectively etchable, conductive metal suitable for biforming to be used. While gold is preferred for use as the second metal, any electrically conductive metal which resists etching by the fluid used to remove the first metal and which can be biformed and later separated from the first metal may be used, the choice of second metal being dictated in part by whether it will be separated from the first metal by etching or fusing. By way of example, it is noted that ferric chloride ($FeCl_3$) may be used to selectively etch nickel, while a commercial gold solvent may be used to selectively etch gold.

It will be noted that the same or different photoresist materials may be used as desired. For example, the various photoresist materials may be sensitive to electromagnetic radiation or light of different frequencies. Also, while the photoresist material used in layer 15 of FIG. 1E must be resistant to the fluid used to etch the first metal, no such requirement exists for the photoresist material used in layer 5 of FIG. 1A or in the islands 11 of FIG. 1C. On the other hand, these other photoresist materials, unlike the photoresist material used in layer 15, must be able to prevent electroplating of the underlying conductive metal.

A variant on the first process may be used to minimize the amount of gold or other second metal used in the islands or to provide an unusually thick monometallic mask according to the present invention. In this variant on the first process, the first metal sheet is coated on its top surface with a layer of photoresist material which is then processed to provide an aperture area pattern of photoresist material comprising photoresist islands aligned with and having a greater cross-section than the effective apertures to be ultimately formed in the finished mask. Islands of a second metal are then formed in an aperture area pattern by vacuum deposition of the second metal on the photoresist islands. These second metal islands will, of course, be no greater in cross-section than the underlying photoresist islands; they will also be aligned with and greater in cross-section than the effective apertures of the finished mask. Islands of a second photoresist material, which may differ in composition from the photoresist material of the islands intermediate the second metal islands and the first metal sheet, are then formed in an aperture area pattern on top of the second metal islands. These top photoresist islands are aligned with and of a cross-section equal to that of the effective apertures of the finished mask. The structure thus formed according to the variant process is identical to that formed by the first process and shown in FIG. 1C, except that the islands 9 are, in the structure of the variant process, a laminar composite of second metal on the top and photoresist material on the bottom. In effect the second metal islands of the first process are supported on the first metal sheet by means of the intermediate photoresist islands. The remainder of the variant process is similar to that of the first process except that, if desired, the first metal underlying the top photoresist islands, the intermediate photoresist islands, the second metal islands and the top photoresist islands may each be selectively etched away in a predetermined sequence.

The construction and features of a preferred embodiment of the novel monometallic mask made by the dissolving technique having been described above, attention is now directed towards a preferred embodiment of the novel mask made by the melting technique.

Figure 2A:
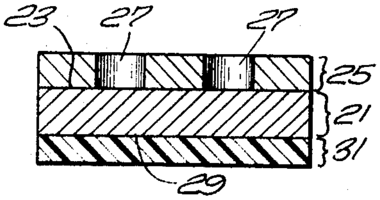

Referring now to FIG. 2, there is shown in FIG. 2A a sheet 21 of a first conductive metal having sufficient thickness to assure flatness and structural stability. The top surface 23 of the first metal sheet 21 has been covered with a layer 25 of an etch-resistant photoresist material, the photoresist layer 25 having been initially formed with or subsequently processed to provide openings 27 therein, aligned with the effective apertures desired in the finished mask. On the bottom surface 29 of the first metal sheet 21, a flat surface has been provided, such as a layer 31 of an etch-resistant film.

Figure 2B:
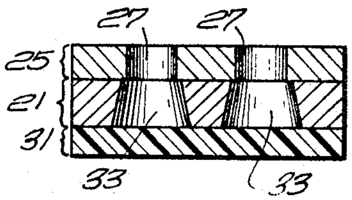

Referring now to FIG. 2B, a fluid for etching the first metal has been introduced through the openings 27 and permitted to remove at least the volumes of the first metal sheet 21 aligned with and underneath the openings 27 in the photoresist layer 25. Each void 23 created in the first metal sheet 21 by this etching communicates with a corresponding opening 27 in the photoresist material layer 25, both void 33 and communicating opening 27 being aligned with the corresponding desired effective aperture of the finished work. It is an essential feature of the novel process that each void 33 created by the etching step is of greater cross-section throughout than the corresponding desired effective aperture of the finished mask.

Figure 2C:
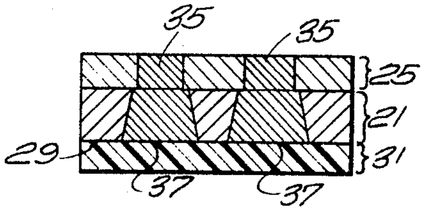

Referring now to FIG. 2C, a molten second electrically conductive material, such as a fusible alloy having a lower fusing temperature than the first metal, was introduced into voids 33 so that upon cooling the second material solidified to provide ingots 35 having bottom surafces 37 abutting the bottom first metal surface 29. The bottom second 33 material surfaces 37 rest upon and have the flatness of the upper surface of film layer 31. As shown in FIIG. 2C, the second metal ingots 25 fills both the openings 27 in the photoresist layer 25 and the voids 33 in the first metal sheet 21; it is unnecessary, however, for the second material to provide more than the bottom second material surfaces 37 flush with the bottom first metal surface 29. Nevertheless, the use of an excess of the second material is permissible as ultimately all of the second material will be recovered in the final steps of the process.

Figure 2D:
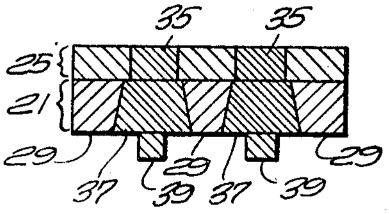

Referring now to FIG. 2D, after solidification of the second material bottom surface 37 the film layer 31 was removed, thereby exposing the plane formed by bottom first metal surface 29 and bottom second material surface 37. Islands 39 of a photoresist material suitable for precluding electroplating were then formed on the bottom second metal surfaces 37, the photoresist islands 39 being aligned with and of similar cross-section to the desired effective apertures of the finished mask. The photoresist islands 39 may conveniently be formed by applying a uniform coat of photoresist material over the plane surface exposed by removal of the film layer 31, exposing the applied photoresist layer to a surface area or aperture area pattern of radiation formed by a sample mask or a negative prepared from a model mask, and developing or removing the photoresist material corresponding to the surface area pattern. The photoresist islands 39 remaining will correspond precisely in area and location to the desired effective aperture area pattern of the finished mask. As each bottom second material surface 37 is aligned with and greater in cross-section than the corresponding effective aperture of the finished mask, it is obvious that each photoresist island 39 is in effect formed on a reduced area of an aligned, corresponding bottom second material surface 37.

Figure 2E:
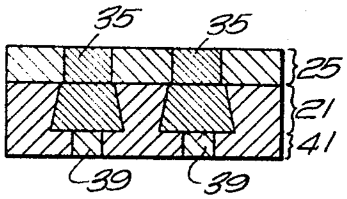

Referring now to FIG. 2E, a layer 41 of first metal has been formed, on the plane defined by the bottom first metal surface 29 and the exposed areas of the bottom second material surfaces 37, to a thickness equal to or less than that of the photoresist islands 39. The first metal layer 41 may be conveniently formed by depositing the first metal by well-known electro-deposition techniques. The first metal 41 forms a surface area pattern having a complimentary or resultant aperture area pattern which is defined by the photoresist islands 39 and, therefore, throughout the thickness of layer 41, aligned with and of precisely equal cross-section to the desired effective apertures of the finished mask.

Figure 2F:
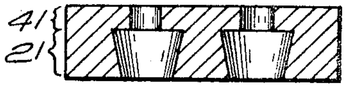

Referring now to FIG. 2F, which shows the finished mask and its effective apertures, the structure shown in FIG. 2E has been turned upsidedown, and the second material ingots 35 and the photoresist materials of both layers 25 and islands 39 have been removed. It is a feature of this embodiment that the second material may be completely and conveniently removed from the mask by turning the mask upsidedown and heating the second material to a temperature which causes it to become molten without deleteriously affecting the first metal. The molten second material is then permitted to flow out of the mask under the influence of gravity, or assisted by the introduction of a pressure differential. Separation of the second material from the first metal is preferably accomplished by utilizing the difference in melting points between the two, although separation may also be accomplished by other means such as by selectively etching the second material with a fluid to which the first metal is stable.

The preferred embodiment of the mask of the present invention prepared by the "melting" technique, like the preferred embodiment prepared by the "dissolving" technique, possesses an aperture area channel of unusual and distinctive cross-section. As clearly shown in FIG. 2F, the channel cross-section is both uniform and smallest throughout layer 41, while the channel cross-section at the top of layer 21, where it meets the bottom of layer 41, is larger than at the exposed bottom surface of layer 21.

The preferred first conductive metal is again nickel, not only for the reasons stated earlier, but also because of its high melting point. The preferred second conductive material may be any electrically conductive metal, alloy or compound which has a low melting point relative to that of the first metal. For example, when the first metal is nickel, the second material may be Cerro Metal. Any of the well-known film-forming materials may be used for layer 31, although easily releasable or release-coated plastic films are preferred.

The unusual monometallic laminated construction of the masks of the present invention, whether prepared by the "dissolving" technique or the "melting" technique, provides a combination of structural strength, flatness, and aperture resolution not heretofore provided without loss of thermal and electrochemical stability resulting from a bimetallic construction.

The construction and features of preferred embodiments of the present invention having now been described, other embodiments and modifications thereof will readily become apparent to those skilled in the art. Accordingly, the scope of the present invention is intended to be limited only by the true spirit and scope of the appended claims.

What is claimed is:

1. A process for manufacturing a monometallic mask providing an effective pattern of surface area and aperture area comprising the steps of (1) forming a laminated structure comprising a top layer of photoresist material carried on a layer of a first metal, said first metal layer being supported by a structure of a second metal, the periphery of said first metal layer being greater than the periphery of said top photoresist layer and smaller than the periphery of said second metal structure; and (2) depositing an aperture-defining layer of additional second metal on the exposed faces of said first and second metal to a thickness reaching at least to the top face of said top photoresist layer, and removing said first metal, said photoresist material and any of said second metal aligned with and under the faces of said photoresist material.

2. The process of claim 1 wherein in step (2) not all of said second metal under the periphery of said first metal is removed.

3. The process of claim 1 wherein in step (1) said first metal layer is supported by a structure of a second metal by means of an intermediate layer of photoresist material.

4. A process for manufacturing a monometallic mask providing an effective pattern of surface area and aperture area comprising the steps of (1) forming an aperture area pattern of a first metal on a first face of a sheet of a second metal, the aperture area of said first metal pattern being aligned with and larger than the aperture area of said effective pattern;

(2) forming an aperture area pattern of photoresist material on the exposed face of said first metal pattern, the aperture area of said photoresist pattern being aligned with and equal to the aperture area of said effective pattern;

(3) forming a surface area pattern of additional second metal onto said second metal sheet face and the exposed first metal, the maximum surface area of said additional second metal being equal to the surface area of said effective pattern and defining the periphery of the corresponding aperture area of said effective pattern;

(4) forming a surface area pattern of additional photoresist material on the opposite face of said second metal sheet, the resultant aperture area on said opposite face being aligned with the aperture area of said effective pattern;

(5) etching and removing, through said resultant aperture area on said opposite face, an aperture area pattern of said second metal sheet including the entire volume of said second metal sheet aligned with said photoresist aperture area pattern on said first metal face; and (6) dissolving said first metal and removing said first metal and said photoresist and additional photoresist materials.

5. The process of claim 4 wherein in step (4) the resultant aperture area on said opposite face is smaller than the aperture area of said first metal pattern.

6. The process of claim 4 wherein in step (5) the volume of said second metal sheet dissolved and removed is less than the entire volume of said second metal sheet aligned with said first metal aperture area pattern.

7. The process of claim 4 wherein in step (3) said additional second metal is formed by depositing it to a height above said first metal pattern but not above said photoresist pattern.

8. The process of claim 5 wherein in step (4) the resultant aperture area on said opposite face is larger than the aperture area of said photoresist pattern.

9. A process for manufacturing a monometallic mask providing an effective pattern of surface area and aperture area comprising the steps of (1) forming a surface area pattern of photoresist material on a first face of a sheet of a first metal, the resultant aperture area formed on said first sheet face being aligned with the aperture area of said effective pattern;

(2) etching and removing, through said resultant aperture area, the entire aperture area pattern of said first metal sheet aligned with the aperture area of said effective pattern;

(3) filling at least the portion of the resultant void in said first metal sheet flush with a second face of said first metal sheet opposite to said first face with a molten second metal;

(4) forming an aperture area pattern of additional photoresist material on the face of said second metal flush with said second face of said first metal sheet, the aperture area of said additional photoresist material being aligned with and equal to the aperture area of said effective pattern;

(5) forming a surface area pattern of additional first metal onto said second face of said first metal sheet and the exposed flush face of said second metal, the maximum surface area of said additional first metal being equal to the surface area of said effective pattern and defining the periphery of the corresponding aperture area of said effective pattern; and (6) fusing said second metal and removing said second metal and said photoresist and additional photoresist materials.

10. The process of claim 9 wherein an etch-resistant easy-release flat film is placed on said second face of said first metal sheet prior to step (2) and removed therefrom between steps (3) and (4) to expose said second face of said first metal sheet and the flush face of said second metal.

11. The process of claim 9 wherein in step (4) the aperture area of said additional photoresist material is aligned with and smaller than the area of the flush face of said second metal.

12. The process of claim 9 wherein in step (2) the volume of said first metal sheet etched and removed is less than the entire volume of said first metal sheet which will be aligned with the maximum area of said second metal.

13. The process of claim 9 wherein a flat film is placed on said first metal sheet face prior to step (3), said molten second metal is permitted to solidify between steps (3) and (4), and said flat film is removed after solidification occurs.

References Cited

UNITED STATES PATENTS

| | | | |
|---|---|---|---|
| 1,376,365 | 4/1921 | Wertheimer | 204—143 |
| 2,226,383 | 12/1940 | Norris | 204—11 |
| 2,469,689 | 5/1949 | Gresham | 204—15 |
| 3,179,543 | 4/1965 | Marcelis | 204—143 |
| 3,192,136 | 6/1965 | Reid | 204—11 |
| 3,359,192 | 12/1967 | Heinrich et al. | 204—143 |

JOHN H. MACK, *Primary Examiner.*

T. TUFARIELLO, *Assistant Examiner.*

U.S. Cl. X.R.

117—212; 156—8; 204—11